W. S. CHILDS.
MILK CAN OR THE LIKE.
APPLICATION FILED FEB. 7, 1912.
1,042,084.
Patented Oct. 22, 1912.
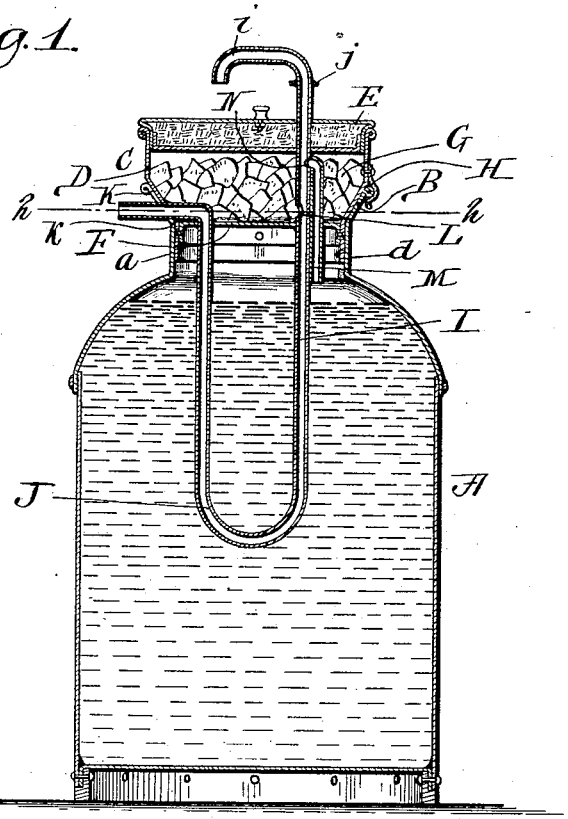
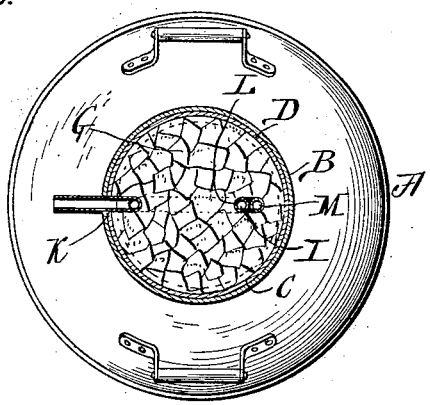
Witnesses:
Jacob Oberst, Jr.
Eda M. Schweiger.
Wallace S. Childs, Inventor.
By Emil Neuhart
Attorney.
COLUMBIA PLANOGRAPH CO., WASHINGTON, D. C.

UNITED STATES PATENT OFFICE.

WALLACE S. CHILDS, OF PROTECTION, NEW YORK, ASSIGNOR OF ONE-HALF TO HARRY E. RICHARDSON, OF EDEN, NEW YORK.

MILK-CAN OR THE LIKE.

1,042,084.  Specification of Letters Patent.  Patented Oct. 22, 1912.

Application filed February 7, 1912. Serial No. 676,044.

*To all whom it may concern:*

Be it known that I, WALLACE S. CHILDS, a citizen of the United States, residing at Protection, in the county of Erie and State of New York, have invented a new and useful Improvement in Milk-Cans or the Like, of which the following is a specification.

My invention relates to improvements in milk cans or the like and more particularly to a closure therefor provided with means for cooling the contents of the milk can or other receptacle.

The object of my invention is the provision of a milk can provided with cooling means of simple construction which will effectively cool milk in transit so that it may be transported greater distances than at present possible.

It also has for its object to confine the cooling means entirely to the cover of the can or other receptacle and to so arrange the same that the cooling medium cannot come in contact with the contents of the can.

A further object is to provide means for allowing the escape of the animal heat from the milk; and to otherwise improve on cooling devices of this character.

To these ends the invention consists in the novel features of construction and in the arrangement and combination of parts to be hereinafter described and particularly pointed out in the subjoined claims.

Figure 1 is a central vertical section of a milk can equipped with my invention. Fig. 2 is a cross-section taken on line 2—2, Fig. 1.

Referring by reference characters to the drawings, A designates the milk can having the usual neck $a$, and flaring mouth B. The can may, however, be otherwise formed, but I have illustrated the type of can now generally in use.

C designates the cover of the can which comprises two parts D and E, the part D forming the cover proper for the can while the part E serves as a lid for the part D. The part D has its circular wall $d$ shaped to conform to the neck and mouth of the can and it is provided with a bottom F so as to form an ice receptacle G, the circular wall has one or more spring clips H secured thereto, which are adapted to engage the bead at the outer end of the mouth and thus hold the cover of the can in closed position.

Secured to the cover is a trap-tube I which extends upwardly from the bottom of the cover a distance and at its upper end is curved laterally, as at $i$, thence downwardly to terminate a short distance above the lid, said tube also extends downward into the milk or other liquid in the can and is thence recurved and passes upwardly and through the bottom of the cover to form a trap-portion J, thence outwardly through the side of the cover and through a slot K formed in the mouth of the can, as at $k$. The tube is soldered or otherwise secured to the bottom of the cover and forms part thereof and when the cover is removed the tube is withdrawn from the can. Said tube has an opening L directly above the bottom of the cover so that the cold water created by the melting of the ice passes into the trap-portion J of the tube and as the milk or other liquid is in contact with said trap-portion, it is cooled and kept in proper condition. When the water in the trap-portion reaches the level of the outwardly-directed terminal $k$ of the tube, it escapes therefrom and drips onto the can, or it may be directed to any point by suitable tube connections with said terminal.

The lid of the cover is chambered and filled with felt or other non-conducting material so that the heat will not so readily melt the ice within the cover. The upper end of the tube serves as a handle for the cover and it has a stop collar $j$ a short distance above the upper face of the lid so that the latter can be lifted above the body of the cover only a sufficient distance to permit it to be swung on the tube for the purpose of rendering the ice-chamber accessible, sufficient clearance being provided between the top of the cover and the upper end of the tube to permit the lid to be raised.

A vent-tube M passes through the bottom of the cover and is soldered to the trap-tube I. Said vent-tube terminates at a point below the lid E when said lid is in closed position and it opens into the trap-tube I, the latter having an opening N for that purpose. This permits the animal heat of the milk to escape and assures not only proper cooling of the milk, but also proper ventilation for the same. Moreover, by thus venting through the trap-tube foreign matter cannot enter the can.

It is apparent that changes in construction and arrangement of parts may be resorted to without departing from this invention.

Having thus described my invention, what I claim is,—

1. A receptacle having a cover provided with an ice-chamber and a tube extending into the receptacle and being in communication with said ice chamber to deliver the water therefrom, said tube being arranged to retain a quantity of water at a point within said receptacle.

2. A receptacle having a cover provided with an ice-chamber, a trap-tube in communication with said ice-chamber and extending down into the receptacle and arranged to receive the water from the ice-chamber and deliver the same outside of said receptacle.

3. A receptacle having a cover provided with an ice-chamber, a tube fastened to said cover and in communication with said ice-chamber, said tube extending downward into said receptacle and thence upward and outward to terminate outside of said receptacle.

4. A receptacle having a cover provided with an ice-chamber, a U-shaped tube having one end extending laterally through said cover and receptacle and terminating outside of both, said tube having a water inlet to deliver water thereinto when the ice melts within the ice-chamber.

5. A receptacle having a chambered cover for the reception of ice, said cover having a lid and a tube extending through said cover and above said lid and also downwardly from said cover into the receptacle thence upwardly into the cover and finally outwardly through the side of said cover, said tube having a water inlet directly above the bottom of said cover.

6. A receptacle having a cover provided with an ice-chamber and a tube in communication with said chamber and extending into said receptacle, and means for venting the receptacle, substantially as and for the purpose described.

7. A receptacle having a cover provided with an ice-chamber, a trap-tube in communication with said ice-chamber and extending down into the receptacle, said tube being arranged to receive the water from the ice-chamber and deliver the same outside of said receptacle, and a vent-tube fastened to said cover and having one end terminating within said receptacle and its other end arranged to vent to the atmospheric air.

8. A receptacle having a cover provided with an ice-chamber, a trap-tube in communication with said ice-chamber and extending down into the receptacle and thence upward and outward to terminate outside of said receptacle, and a vent-tube arranged adjacent said trap-tube and having one end in communication therewith and its other end extending into said receptacle.

9. A receptacle having a cover comprising a body-portion and a lid closing the top of said body-portion, said body-portion serving as an ice-chamber and having a trap-tube secured thereto, one end of said trap-tube being directed outwardly through the body-portion of the cover and the other end being directed upwardly through the lid of the cover thence laterally to serve as a handle for the cover, said last-mentioned end being open and a vent-tube arranged to lie in contact with said trap-tube and having one end in communication with said trap-tube and its other end extending into the receptacle, said trap-tube having an opening to receive the water from the ice-chamber, substantially as and for the purpose set forth.

10. A receptacle having a cover provided with an ice-chamber, said cover having a trap-tube secured thereto, one end of said trap-tube being directed outwardly through the body-portion of the cover and the other end being directed upwardly through the top of the cover, the intermediate portion of said tube being bent into U-shape and extends into said receptacle, said tube having a water inlet near the lower end of the ice-chamber, and a vent-tube having one end in communication with the interior of said receptacle and its other end in communication with said trap-tube above said water inlet.

11. A receptacle having a cover comprising a body-portion and a lid closing the top of said body-portion, said body-portion serving as an ice chamber and having a trap-tube secured thereto, one end of said trap-tube being directed outwardly through the body-portion of the cover and the other end being directed upwardly through the lid of the cover thence laterally to serve as a handle for the cover, and means to prevent removal of the lid from the cover.

12. A receptacle having a cover comprising a body-portion and a lid, a tube passing through said cover to one side of its center and extending above the same to form a handle and beneath the same and being curved into trap formation beneath the cover and finally outwardly to terminate outside of the cover, said tube being fastened to the bottom of the cover so as to be removed with the latter and said lid being slidable on said tube so as to permit of its being swung thereon when raised to clear the upper edge of said body-portion.

In testimony whereof, I have affixed my signature in the presence of two subscribing witnesses.

WALLACE S. CHILDS.

Witnesses:
JACOB OBERST, Jr.,
ELIZABETH HEINTZ.

Copies of this patent may be obtained for five cents each, by addressing the "Commissioner of Patents, Washington, D. C."